United States Patent [19]

Hanke

[11] 4,262,720

[45] Apr. 21, 1981

[54] TREAD FOR A PNEUMATIC TIRE

[75] Inventor: Wolfgang Hanke, Vienna, Austria

[73] Assignee: Semperit Aktiengesellschaft, Vienna, Austria

[21] Appl. No.: 38,454

[22] Filed: May 14, 1979

[30] Foreign Application Priority Data

Nov. 28, 1978 [DE] Fed. Rep. of Germany .......... 11501

[51] Int. Cl.³ .................. B60C 11/00; B60C 11/08
[52] U.S. Cl. .............................. 152/209 D; D12/147
[58] Field of Search .... 152/209 D, 209 NT, 209 WT, 152/209 R, 209 B, 324, 325, 352 R, 354 R, 354 RB; D12/143, 146, 140, 147

[56] References Cited

U.S. PATENT DOCUMENTS

| D. 185,896 | 8/1959 | Johnson, Jr. ............ 152/209 D X |
| 3,584,670 | 6/1971 | Verdier ..................... 152/209 R |

FOREIGN PATENT DOCUMENTS 982784  6/1951  France .................................. 152/209 R Primary Examiner—John T. Goolkasian
Assistant Examiner—Thomas Bokan
Attorney, Agent, or Firm—Werner W. Kleeman

[57] ABSTRACT

A tread for a pneumatic tire comprising two inner ribs extending in the circumferential direction of the tire and, to both sides thereof, tiers or block rows extending in the circumferential direction of the tire. The block rows and ribs are each separated from one another by a respective zig-zag configured circumferential groove. Each leg of the intermediate circumferential groove encloses, with the circumferential direction of the tire, an angle α of approximately 30° to 50°, whereas the legs of the lateral circumferential grooves enclose, with the circumferential direction of the tire, an angle β of approximately 55° to 65° and the lateral circumferential grooves are each wider than the intermediate circumferential groove.

4 Claims, 2 Drawing Figures

TREAD FOR A PNEUMATIC TIRE

BACKGROUND OF THE INVENTION

The present invention relates to a new and improved construction of a tread for a pneumatic tire which is of the type comprising two inner ribs extending in the circumferential direction of the tire and, to both sides of said ribs, tiers or block rows likewise extending in the circumferential direction of the tire, the block rows and ribs being separated from one another in each case by a respective zig-zag circumferential groove.

Such type tires are designed for use during winter driving conditions and over relatively rough terrain or land. By providing a rather coarse pattern of the tire profile such tires have improved traction in snow. The snow which is compressed by the pressure of the tire thus forms, within the profile grooves, a particularly highly compacted structure or rib configuration, so that, similar to the transmission of forces between a gear and rack, the engine power of the vehicle is transmitted to the road surface or the like extensively free of loss.

Heretofore known constructions of the previously mentioned type of tire treads possess three identical zig-zag configured circumferential grooves. Since at the region of the tread or contact surface of the tire the tread pressure of passenger vehicle tires acting upon the roadway surface is greater at the shoulder region than at the center of the tread, there arises a different degree of compaction of the snow in the aforementioned circumferential grooves. As a consequence thereof, the traction is reduced, since, as a practical matter, only both of the outer or lateral circumferential grooves are effective.

SUMMARY OF THE INVENTION

Therefore, with the foregoing in mind it is a primary object of the present invention to provide a new and improved construction of tread for a pneumatic tire which is not afflicted with the aforementioned drawbacks and limitations of the prior art constructions.

Another and more specific object of the present invention aims at improving the previously described tire tread in that, the intermediate circumferential groove, located at the region of least tread pressure, completely contributes in increasing tire traction, and the tread or contact surface of the tire has imparted thereto particularly favorable properties as concerns drainage of the snow slush, straight travel stability, low rolling resistance and good self-cleaning capability.

Now in order to implement these and still further objects of the invention, the tread of the pneumatic tire is manifested by the features that the zig-zag configured circumferential grooves, which define an intermediate circumferential groove and to both sides thereof a respective lateral circumferential groove, each have legs or leg portions. The legs of the intermediate circumferential groove enclose, with the circumferential direction of the tire, in each case an angle $\alpha$ of approximately 30° to 50°, whereas the legs of the lateral circumferential grooves enclose, again with respect to the circumferential direction of the tire, an angle $\beta$ of approximately 55° to 65°, and the lateral circumferential grooves are wider in each case than the intermediate circumferential groove.

Owing to the increased snow take-up capacity of the wider lateral circumferential grooves, which are also longer owing to the larger angular positioning or angulation thereof with respect to the circumferential direction of the tire, in comparison to the intermediate circumferential groove, the snow compaction, notwithstanding the higher tread pressure, is not greater than in the intermediate, narrower circumferential groove. Consequently, the entire contact surface of the snow covered roadway with the tread of the tire is uniformly loaded in shear. This leads to particularly good traction both in the circumferential and also axial direction of the tire.

The wide, lateral circumferential grooves optimumly perform their function of drainage of the snow slush owing to their large width in axial direction and also in the direction perpendicular to the groove lengthwise direction, so that there is beneficially avoided the effect of tire lift-off similar to aqua-planning, and the resultant loss of tire contact with the road surface.

An angle $\alpha$ of less than 30° would result in a rather weak zig-zag configuration, and thus, a very limited traction capability of the tire in the circumferential direction, whereas an angle $\alpha$ greater than 50°, while affording good traction in the circumferential direction of the tire, on the other hand, however, would result in practically complete loss in the lateral traction of the tire which suppresses sliding away of the tire in axial direction.

An advantageous construction of the inventive tread resides in connecting the intermediate circumferential groove with the lateral circumferential grooves in each case after three successive legs by means of a transverse connection constituting an extension or elongated portion of the fourth leg in the lengthwise extent thereof. In consequence thereof, there is produced a fine arrangement or structure of the tire profile which is associated with a reduction of the rolling resistance, and thus, a saving in the consumption of fuel. In addition thereto there is realized a reduction in the running noise of the tire, since the grooves which are inclined with respect to the axial direction of the tread ensure that the tire profile-block edges always only contact the roadway surface at a minimum length. Additionally, it is possible, by virtue of the foregoing measures, to extensively eliminate the resonance oscillations which are extremely disadvantageous for the vehicle.

If the transverse connections have approximately the same width as the intermediate circumferential groove, then there is afforded a particularly good drainage of the snow slush or the like and an improvement in the tire traction in circumferential and axial direction owing to the wide transverse connection groove extending transversely over the entire tread.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
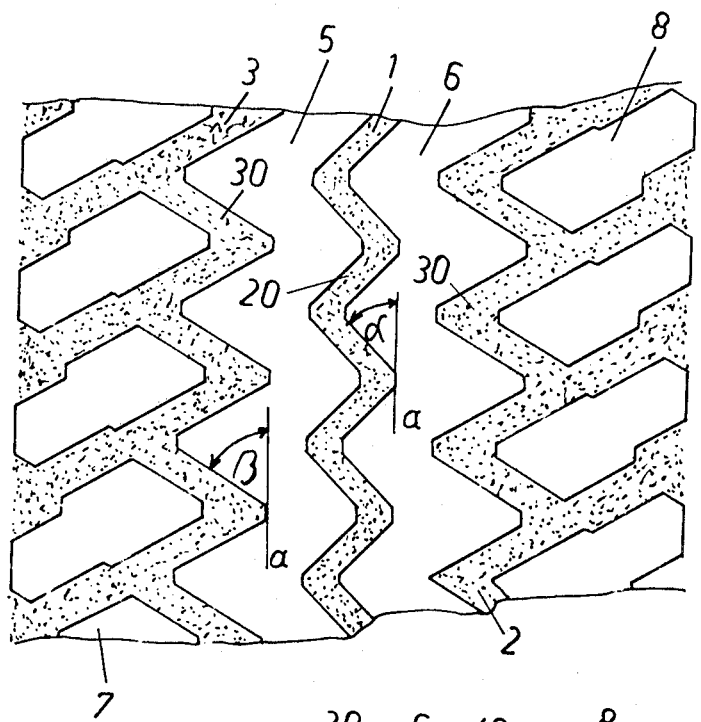
FIG. 1 illustrates in fragmentary view part of a tire tread constructed according to the invention.

Describing now the drawings, only enough of the tire has been shown in each of the embodiments of FIGS. 1 and 2, to enable one skilled in the art to readily understand the underlying principles an concepts of the features of the inventive tire treads. Throughout the various figures the same reference characters have been generally employed to denote the same or analogous components. Turning now attention to the tire tread construction of FIG. 1, there will be seen that there are provided the circumferential grooves 1, 2 and 3, wherein the circumferential groove 1 constitutes an intermediate circumferential groove and the other circumferential grooves 2 and 3 constitute lateral circumferential grooves, each arranged to opposite sides of the intermediate circumferential groove 1, as shown. The zig-zag configured ribs 5 and 6, arranged to opposite sides of the intermediate circumferential groove 1, and between the latter and the lateral circumferential grooves 3 and 2, respectively, extend completely about the tire. Both of the lateral circumferential grooves 2 and 3 are wider than the intermediate circumferential groove 1 and enclose, with respect to the circumferential direction a of the tire, a larger angle $\beta$ than the angle $\alpha$ enclosed by the intermediate circumferential groove 1.

In particular, it will be seen that the zig-zag configured intermediate circumferential groove 1 contains legs or leg portions, generally indicated by reference character 20, which enclose an angle $\alpha$ with respect to the circumferential direction a of the tire. This angle $\alpha$ is in a range of about 30° to 50°. Equally, the lateral circumferenial grooves 2 and 3 each have a zig-zag configuration and contain leg portions or legs, generally indicated by reference character 30, which enclose the angle $\beta$ with respect to the circumferential direction a of the tire. This angle $\beta$ is in a range of about 55° to 65°.

In the embodiment of tire tread shown in FIG. 1 a respective row of tread blocks or tires 7 and 8 follow both of the ribs 5 and 6 at lateral regions of the tire tread.

Figure 2:
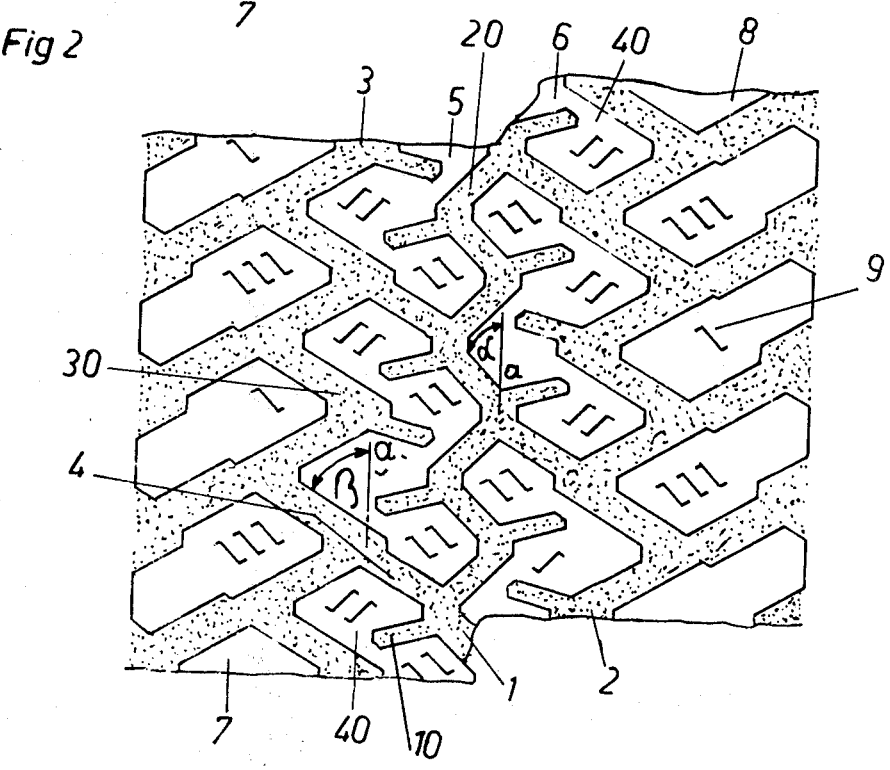
FIG. 2 illustrates, similar to the showing of FIG. 1, a modified construction of tire tread.

Now in the modified construction of tire tread, as shown in FIG. 2, wherein there have been generally employed the same reference characters to denote the same structure as in the arrangement of FIG. 1, the transverse connections 4 connect both of the lateral circumferential grooves 2 and 3 with the intermediate circumferential groove 1 and subdivide the ribs 5 and 6 into individual blocks 40. These transverse connections 4 constitute an extension of the legs 30 of the related lateral circumferential grooves 2 and 3 and extend essentially in the same direction thereof. In the embodiment under discussion, each such transverse connection 4 is arranged after three successive legs 30 of the related lateral circumferential groove 2 and 3 and constitutes an extension of the fourth leg 30 thereof. The transverse connections 4 have approximately the same width as the width of the intermediate circumferential groove 1. Again as for the embodiment of tread shown in FIG. 1 the relationship of the angles $\alpha$ and $\beta$ is maintained.

Further, it will be seen that the intermediate circumferential groove 1 is provided with laterally extending blind hole grooves 10 serving to increase the traction and shorten the braking path by so-to-speak loosening the tread blocks 40, in other words enhance the relaxation capability of such blocks. Finally, the fine cuts or notches 9 at the tire tread increase the flexibility of the individual blocks 8 and 40.

While there are shown and described present preferred embodiments of the invention, it is to be distinctly understood that the invention is not limited thereto, but may be otherwise variously embodied and practiced within the scope of the following claims. Accordingly,

What I claim is:

1. A tread for a pneumatic tire comprising:
two inner ribs extending in the circumferential direction of the tire;
a respective row of blocks extending in the circumferential direction of the tire and arranged laterally outwardly of the two inner ribs;
respective zig-zag configured circumferential grooves for separating said rows of blocks and ribs from one another;
said respective zig-zag circumferential grooves consisting essentially of an intermediate circumferential groove and two lateral circumferential grooves, each of which is arranged to one respective side of said intermediate circumferential groove and at the central region of such tire;
each of said circumferential grooves having legs;
said legs of the intermediate circumferential groove enclosing, with respect to the circumferential direction of the tire, an angle in the order of about 30° to 50°;
the legs of the lateral circumferential grooves enclosing, with respect to the circumferential direction of the tire, an angle in the order of about 55° to 65°; and
said lateral circumferential grooves each being wider than the width of the intermediate circumferential groove.

2. The tread as defined in claim 1, wherein:
a leg of each lateral circumferential groove, and which leg defines a fourth leg following three legs of such lateral circumferential groove, embodies an extended transverse connection means for interconnecting the intermediate circumferential groove with the related lateral circumferential groove.

3. The tread as defined in claim 2, wherein:
each said transverse connection means defines an extension of said fourth leg which extends essentially in the lengthwise direction of said fourth leg.

4. The tread as defined in claim 2, wherein:
each said transverse connection means possesses approximately the same width as the width of the intermediate circumferential groove.

* * * * *